Dec. 23, 1924.
A. D. LIGHTNER ET AL
1,520,293
DECKING SYSTEM
Filed Jan. 6, 1919
2 Sheets—Sheet 1
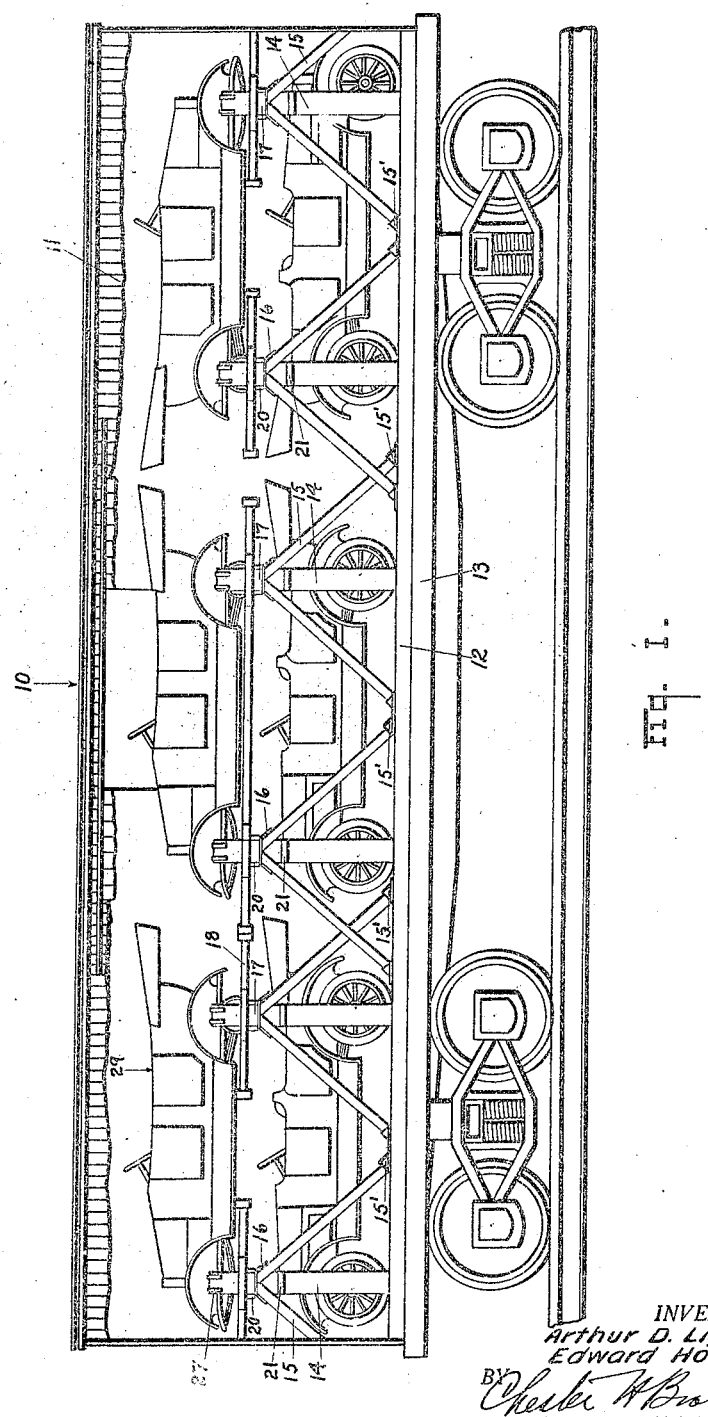
FIG. I.
INVENTORS
*Arthur D. Lightner*
*Edward Holmes*
BY
ATTORNEY

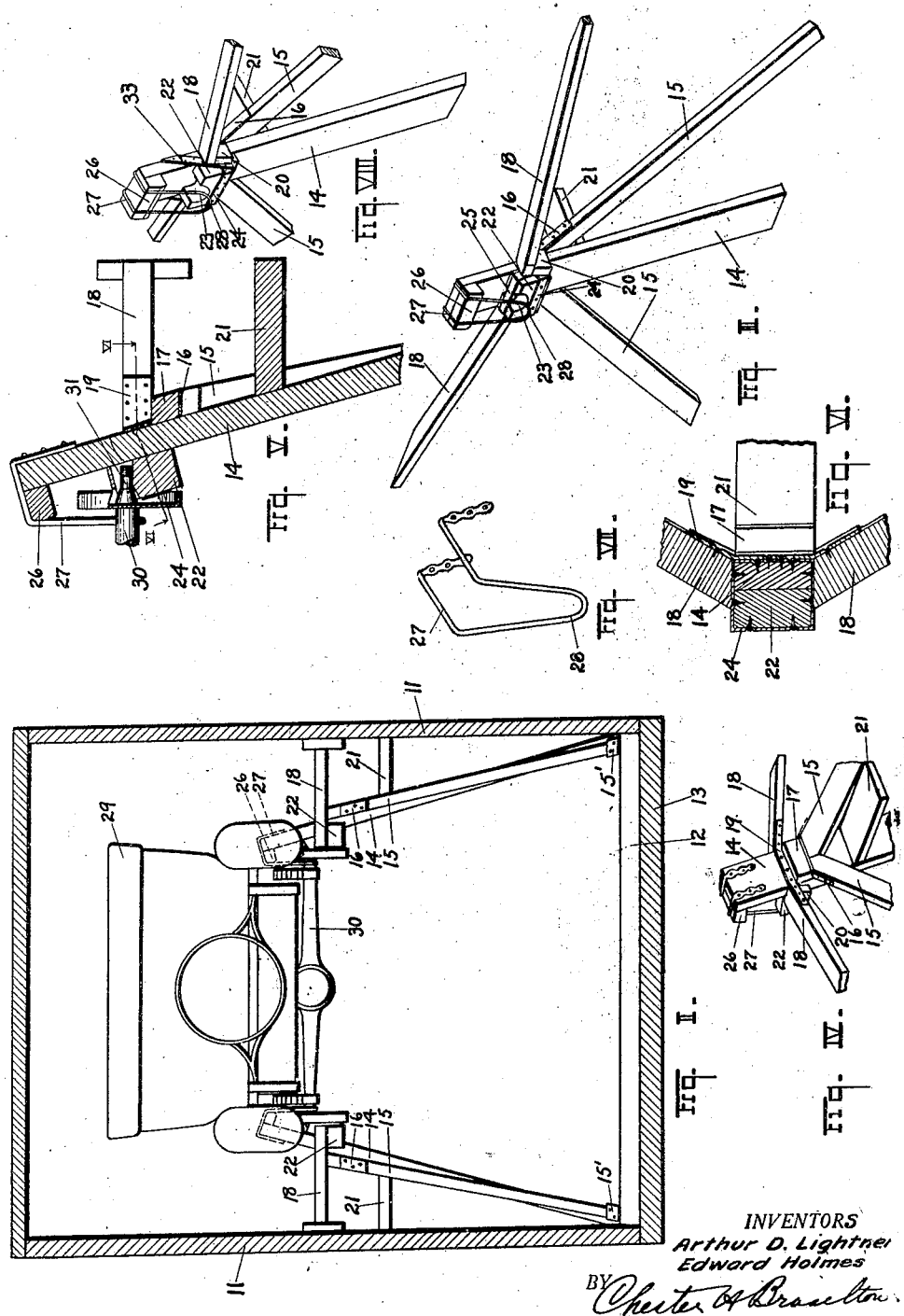

Patented Dec. 23, 1924.

1,520,293

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

DECKING SYSTEM.

Application filed January 6, 1919. Serial No. 269,918.

*To all whom it may concern:*

Be it known that we, ARTHUR D. LIGHTNER and EDWARD HOLMES, citizens of the United States, residing at Toledo, county of Lucas, and State of Ohio, have invented certain new and useful Improvements in Decking Systems, of which we declare the following to be a full, clear, and exact description.

This invention relates to improved decking systems for loading automobiles or the like, and refers more particularly to an improved arrangement for decking automobiles one above another in freight cars.

One object of the invention is to provide an improved decking system by means of which automobiles may be so supported in freight cars that one automobile may be loaded above the other in the car.

A further object of our invention is to provide such a system as will securely retain the automobiles in position and guard against injury thereto during the movement of the car, and accomplish this purpose with the greatest economy of lumber and labor which is possible.

A further object of our invention is to provide a system of loading automobiles in freight cars whereby the upper series of cars may be held in such position as to permit the lower series of cars to be readily placed in position and removed therefrom without interference with the supporting structure for holding the upper series of cars in position.

Further objects, and objects relating to economies of construction and details of arrangement will definitely appear from the detailed description to follow. We accomplish the objects of our invention in one instance by the devices and means described in the following specification, but it is evident that the same may be varied without departing from the scope of the invention as pointed out in the appended claims.

A structure constituting one embodiment of our invention, which may be the preferred, is illustrated in the accompanying drawings, forming a part hereof, in which:

Figure I is a view in side elevation of a freight car having constructed therein a system of bracing and support embodying the invention, the side of the freight car being broken away for convenience in showing the bracing members, and a plurality of automobiles being shown supported in position therein by this system of bracing and support.

Figure II is a transverse sectional view of a freight car having constructed therein a system of bracing and support embodying the invention, and illustrating its position with reference to an automobile of the upper series.

Figure III is a detail perspective view of one section of the supporting means.

Figure IV is a detail perspective view of a section of the supporting system, similar to that shown in Figure III, but taken from an opposite side thereof.

Figure V is a vertical sectional view of a section of the supporting system, showing the manner of mounting of a end of an automobile axle thereon.

Figure VI is a horizontal sectional view taken along the line VI—VI of Figure V.

Figure VII is a detail view illustrating one of the loops for supporting the end of the automobile axle.

Figure VIII is a detail perspective view of a slightly modified form of supporting section.

In the drawing, similar reference characters refer to corresponding parts throughout the several views, and the Fig. VI is taken looking in the direction of the small arrows at the ends of the section line.

Referring to the numbered parts of the drawing, 10 indicates a freight car having side walls 11 and a floor 12 supported on the sills 13. In the freight car is constructed a plurality of bracing sections, each of which is made up of the main supporting member 14, the lower end of said member being secured to the floor of the car at a point near the side thereof, and the upper ends of corresponding members 14 converging toward the interior of the car, as shown in Figure II of the drawing. Two bracing members 15 are secured to the floor of the car at points spaced from the supporting members 14 and converge upwardly to a point near the upper end of each of the members 14, where they are attached thereto in any suitable manner. Metal plates 15' so formed as to receive the lower ends of the bracing members 15 and hold the same may be employed for securing the lower ends of the bracing members to the floor of the car as such a holding means prevents splitting of the lower end of the members such as might occur if the braces were nailed or bolted to the flooring. A metal strap 16 may assist in holding the upper ends of the two bracing members 15 together, and the upper ends of the bracing members abut against a block 17, secured to the supporting member 14 in any desired manner. Two supplemental bracing members 18 are attached to the sides of the car at points spaced from the supporting members 14 and converge inwardly toward a point near the upper end of the supporting member 14, where they are attached hereto in any desired manner. A metal strap 19 is preferably employed to assist in holding the inner ends of the bracing members 18 in proper position relative to the supporting member 14.

Blocks 20 may be secured to the sides of the supporting member 14 to enable the bracing members 18 to be more firmly attached thereto and secured from movement thereupon. A horizontal bracing member 21 is adapted to extend between the supporting member 14 and the side of the car, which when firmly secured in position relative to these parts forms an additional brace for the supporting member and prevents its outward movement towards the side of the car.

A block 22, provided with a recess 23 upon its upper face for the reception of the end of an axle of the automobile, is attached to the upper portion of the supporting member 14 upon the inner face thereof in any suitable manner, and is additionally secured thereto by means of a metal strap 24 encircling the block and the supporting member. A metal strap 25 is provided which is adapted to extend across the upper face of the block 22, and to assist in holding the end of the axle therein. An additional block 26 is secured to the inner face of the supporting member 14 at a point near the upper end thereof, and serves as a bearing for a metal strap 27, the ends of which are adapted to be secured to the supporting member 14, and the inner portion of which forms a loop underlying the axle at a point adjacent its end and assists the supporting member in holding the axle in position. The automobile is designated by the reference character 29, and is provided with axles 30 having spindles 31 which rest upon and are supported in part by the blocks 22. The blocks 26 attached to the upper end of each of the members 14 serve as an additional support for the strap 27 and helps to prevent splitting or shattering of the upper end of the member 14 by reason of the weight carried thereby and the strains to which it is subjected when the car is in motion. By supporting the ends of the axles upon the blocks 22 attached to the members 14, the said members 14 are less liable to become split by supporting the weight of the car than would be the case if the ends of the axles were supported upon the ends of the supporting members.

In the modified form shown in Figure VIII an additional strap 33 is employed for supporting the block 22 in position on the member 14 which may have its ends attached to the supporting members and form a loop underlying the block to better secure the block from being detached while in use.

It will be seen that the straps 27 form a supplemental supporting means for the ends of the axles as they assist the blocks 22 in supporting the same and tend to prevent disengagement of the supporting members therefrom.

From the description of the parts given above, the construction and operation of this system of bracing and support will be readily understood. One section of the bracing and supporting system, such as has been described above in detail, is located at the end of each axle for the purpose of supporting and bracing the upper automobiles in each car. In this system of bracing and support the deadweight of the automobile is supported by the several bracing members 14 and the bracing member 15 connected therewith, while the strains occasioned by the movement of the cars or of a sudden stopping and starting of the same are overcome by the bracing members 18 and the horizontally positioned braces 21. By the provision of the block 17 the braces 15 are more firmly secured to the supporting members 14 and a side rest is provided for the upper end of the braces 15. By the positioning of the block 22 upon the inner face of the supporting member 14, the opposite supporting members 14 may be placed farther apart, thus leaving more space for the accommodation of the lower row of automobiles and consequently, allow them to be more easily placed in position or removed therefrom. The provision of a strap 27 provided with loop portion 28 serves as an additional support for the axles and tends to distribute the weight upon different parts of the supporting member 14 to prevent injury thereto, and to render the block 22 less liable of being torn from the supporting member. It will be seen that by this construction the opposite supporting members 14 will not be forced inwardly towards each other to an undue extent by the movement of the car, as such action will be prevented by the supporting members striking the ends of the axles.

If, however, due to any exceptional strain, one end of the axle becomes disengaged from the block 22, the strap 27, which is formed of such a length as to be placed under tension and support part of the weight of the axle normally, will carry the entire weight of the axle and by reason of its surrounding the axle beyond the brake drum will not become easily disengaged from the axle so as to allow the same to drop and thus cause injury to the automobile positioned thereunder.

In loading automobiles when using this system of bracing and support, the automobiles which are to be stored in elevated position are hoisted into the upper part of the car by any suitable means and supporting sections are then placed beneath the ends of the axles. The automobile is then lowered until the spindles rest in the recesses 23 formed upon the upper sides of the blocks 22, and upon the straps 27 which have been placed over the upper ends of the supporting members and secured thereto so as to rest upon and be partially carried by the blocks 26. The straps 25 are then placed in position as shown for holding the ends of the axles within the recesses formed in the upper surfaces of the blocks 22. Another automobile may then be stored beneath the first, as shown in Figure I of the drawing. By reason of the provision of blocks 22 on the inner faces of the main supporting members 14, and the more nearly vertical position of these members than would be possible if the ends of the axles rested directly thereon, any tendency towards the axle becoming disengaged from the main supporting members 14 is opposed both by the ends of the axles pressing against the inner faces of the supporting members and by the nearly vertical position of the members which renders them less liable to be forced inwardly and thus allow the automobile to fall.

This nearly upright position of the supporting members also provides a wider space within the car for the reception of the lower series of automobiles, and serves to more effectively brace the upper automobiles.

While we have shown and described in considerable detail a specific embodiment of our invention, it is to be understood that this showing and description is illustrative only and for the purpose of rendering our invention more clear, and that we do not regard the invention as limited to the details of construction illustrated or described, nor any of them, except in so far as we have included such limitations within the terms of the following claims, in which it is our intention to claim all novelty inherent in our invention broadly as well as specifically.

Having thus described our invention, what we claim as new and desire to secure by Letters Patent, is:

1. In combination, a structure for loading vehicles in freight cars including a support extending upwardly and inwardly from the side of the car, a member disposed below the top of said support on the inner face thereof and adapted to receive one end of the axle of the vehicle, means connected with the top of said support and extending downwardly therefrom beneath the axle to support the same, and means for bracing said support.

2. In combination, a structure for loading vehicles in freight cars including a support extending upwardly and inwardly from the side of the car and adapted to receive the end portion of the vehicle axle at a point below the top of the support, a strap connected with the support above the axle and extending beneath the latter in supporting engagement therewith, and means for bracing the support.

3. In combination, a structure for loading vehicles in freight cars including a support extending upwardly into the car from the side thereof, a block secured to the inner face of the support below the top thereof and having a recessed portion adapted to receive the end portion of the vehicle axle, a strap connected with the upper end of said support and extending downwardly beneath the axle to support the same, and means for bracing the support against the wall of a car.

4. In combination, a structure for loading vehicles in freight cars including a support extending upwardly into the car from the side thereof, means upon said support below the top thereof for receiving the end portion of the vehicle axle, a strap secured to the outer face of the support and extending over the top thereof and downwardly to engage and support the axle, and means for bracing the support.

5. In combination, a structure for loading vehicles in freight cars including a support extending upwardly into the car from the side thereof, a strap connected with the outer face of the support and extending over the top thereof and downwardly therefrom and adapted to receive and support one end of the axle of the vehicle, and means for bracing the support.

6. In combination, a structure for loading vehicles in freight cars including a strut extending upwardly and inwardly from the side of the car, means upon the inner face of the strut for engaging and supporting one end of the axle of the vehicle, a pair of braces extending in a plane substantially parallel to the strut and having their lower ends secured to the floor of the car and their upper ends disposed upon the outer face of the strut, and a block secured upon the outer face of the strut and adapted to overlie the ends of said braces.

7. In combination, a structure for loading vehicles in freight cars including a strut extending upwardly and inwardly from the side of the car, means upon the inner face of the strut for engaging and supporting one end of the axle of the vehicle, a pair of braces extending in a plane substantially parallel to the strut and having their lower ends secured to the floor of the car and their upper ends disposed upon the outer face of the strut, a block secured upon the outer face of the strut and adapted to overlie the ends of said braces, and horizontally disposed braces having their outer ends connected with the walls of the car and their inner ends engaging the edges of the strut to brace the same.

8. In combination, a structure for loading vehicles in freight cars including a support extending upwardly and inwardly from the side of the car, means thereon for engaging and supporting one end of the axle of the vehicle, a pair of braces extending in a plane substantially parallel with the support and having their lower ends secured to the floor of the car and their upper ends disposed upon the outer face of the support, a strap extending over the upper ends of said braces and connecting them together, a block disposed upon the outer face of the support above said strap to form an abutment for said braces, and additional means for bracing the support.

9. In combination, a structure for loading vehicles in freight cars including a strut extending upwardly and inwardly from the side of the car, a block disposed upon the inner face of the strut and recessed to receive one end of the vehicle axle, a strap extending under the block to support the same and having its ends carried upwardly and secured to the strut, and means for bracing the strut.

In testimony whereof, we affix our signatures.

ARTHUR D. LIGHTNER.
EDWARD HOLMES.